(12) United States Patent
Wagner et al.

(10) Patent No.: US 11,660,763 B2
(45) Date of Patent: *May 30, 2023

(54) SYSTEMS AND METHODS FOR PROVIDING VACUUM VALVE ASSEMBLIES FOR END EFFECTORS

(71) Applicant: Berkshire Grey Operating Company, Inc., Bedford, MA (US)

(72) Inventors: Thomas Wagner, Concord, MA (US); Kevin Ahearn, Fort Mill, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/504,977

(22) Filed: Oct. 19, 2021

(65) Prior Publication Data

US 2022/0055231 A1 Feb. 24, 2022

Related U.S. Application Data

(60) Continuation of application No. 16/830,574, filed on Mar. 26, 2020, now Pat. No. 11,185,996, which is a
(Continued)

(51) Int. Cl.
*B25J 15/06* (2006.01)
*B65G 47/91* (2006.01)

(52) U.S. Cl.
CPC ....... *B25J 15/0625* (2013.01); *B25J 15/0633* (2013.01); *B25J 15/0658* (2013.01); *B25J 15/0691* (2013.01); *B65G 47/91* (2013.01)

(58) Field of Classification Search
CPC .............. B25J 15/0625; B25J 15/0633; B25J 15/0658; B25J 15/0691; B25J 15/0616; B65G 47/91
See application file for complete search history.

(56) References Cited

U.S. PATENT DOCUMENTS 2,853,333 A 9/1958 Littell
3,005,652 A 10/1961 Helm
(Continued)

FOREIGN PATENT DOCUMENTS

CN 1367729 A 9/2002
CN 101323396 A 12/2008
(Continued)

OTHER PUBLICATIONS

Anver Corporation: Vacuum Tube Lifting Systems, Nov. 22, 2004 (http://www.jrgindustries.com/assets/anver.pdf).
(Continued)

*Primary Examiner* — Stephen A Vu
(74) *Attorney, Agent, or Firm* — Gesmer Updegrove LLP (57) ABSTRACT

An end effector is disclosed for an articulated arm. The end effector includes a valve assembly including a plurality of supply channels, each supply channel including a supply conduit, a pressure sensor in fluid communication with the supply conduit, and a supply conduit plug. The supply conduit is in fluid communication with a vacuum source. During use, each supply conduit is either at vacuum such
(Continued)

that the pressure within the supply conduit is substantially at a vacuum pressure, or is at a pressure that is substantially higher than vacuum pressure because the supply conduit plug has moved to block a portion of the supply conduit. The pressure sensor of each supply conduit provides a pressure sensor signal responsive to whether the pressure in the conduit is either substantially at vacuum or is at a pressure that is substantially higher than vacuum.

38 Claims, 9 Drawing Sheets

Related U.S. Application Data continuation of application No. 16/391,980, filed on Apr. 23, 2019, now Pat. No. 10,647,005, which is a continuation of application No. 15/961,275, filed on Apr. 24, 2018, now Pat. No. 10,300,612, which is a division of application No. 15/248,379, filed on Aug. 26, 2016, now Pat. No. 9,999,977.

(60) Provisional application No. 62/210,246, filed on Aug. 26, 2015.

(56) References Cited

U.S. PATENT DOCUMENTS

| | | | |
|---|---|---|---|
| 3,195,941 | A | 7/1965 | Morey |
| 3,637,249 | A | 1/1972 | Kuhl et al. |
| 4,389,064 | A | 6/1983 | Laverriere |
| 4,412,775 | A | 11/1983 | Molitor et al. |
| 4,495,968 | A | 1/1985 | Kist |
| 4,557,659 | A | 12/1985 | Scaglia |
| 4,880,358 | A | 11/1989 | Lasto |
| 5,024,575 | A | 6/1991 | Anderson |
| 5,752,729 | A | 5/1998 | Crozier et al. |
| 5,865,487 | A | 2/1999 | Gore et al. |
| 5,890,553 | A | 4/1999 | Bar-Cohen |
| 6,015,174 | A | 1/2000 | Raes et al. |
| 6,244,640 | B1 | 6/2001 | Le Bricquer et al. |
| 6,397,876 | B1 | 6/2002 | Goldern et al. |
| 6,817,639 | B2 | 11/2004 | Schmalz et al. |
| 7,076,335 | B2 | 7/2006 | Seemann |
| 7,140,389 | B2 | 11/2006 | Schnatterer et al. |
| 7,263,890 | B2 | 9/2007 | Takahashi |
| 7,618,074 | B2 | 11/2009 | Zimmer |
| 7,637,548 | B2 | 12/2009 | Fukano et al. |
| 7,677,622 | B2 | 3/2010 | Dunkmann et al. |
| 8,070,203 | B2 | 12/2011 | Schaumberger |
| 8,096,598 | B2 | 1/2012 | Perlman |
| 8,132,835 | B2 | 3/2012 | Ban et al. |
| 8,267,386 | B2 | 9/2012 | Schaaf et al. |
| 8,662,861 | B2 | 3/2014 | Tell |
| 8,777,284 | B2 | 7/2014 | Schaller et al. |
| 9,011,407 | B2 | 4/2015 | Harig |
| 9,061,868 | B1 | 6/2015 | Paulsen et al. |
| 9,656,813 | B2 | 5/2017 | Dunkmann et al. |
| 9,999,977 | B2 * | 6/2018 | Wagner ............... B25J 15/0625 |
| 10,058,896 | B2 | 8/2018 | Hicham et al. |
| 10,118,300 | B2 | 11/2018 | Wagner et al. |
| 10,300,612 | B2 * | 5/2019 | Wagner ............... B25J 15/0633 |
| 10,315,315 | B2 | 6/2019 | Wagner et al. |
| 10,399,236 | B2 | 9/2019 | Wagner et al. |
| 10,647,005 | B2 * | 5/2020 | Wagner ............... B25J 15/0625 |
| 11,185,996 | B2 * | 11/2021 | Wagner ............... B25J 15/0691 |
| 2001/0013434 | A1 | 8/2001 | Hopkins |
| 2001/0045755 | A1 | 11/2001 | Schick et al. |
| 2003/0038491 | A1 | 2/2003 | Schmalz et al. |
| 2003/0164620 | A1 | 9/2003 | Schmalz et al. |
| 2006/0242785 | A1 | 11/2006 | Cawley et al. |
| 2008/0179224 | A1 | 7/2008 | Van Bossuyt |
| 2009/0019818 | A1 | 1/2009 | Gilmore et al. |
| 2013/0129464 | A1 | 5/2013 | Regan et al. |
| 2013/0232918 | A1 | 9/2013 | Lomerson, Jr. |
| 2013/0277999 | A1 | 10/2013 | Schaller et al. |
| 2014/0005831 | A1 | 1/2014 | Naderer et al. |
| 2015/0081090 | A1 | 3/2015 | Dong |
| 2015/0298316 | A1 | 10/2015 | Accout et al. |
| 2015/0328779 | A1 | 11/2015 | Bowman et al. |
| 2015/0375401 | A1 | 12/2015 | Dunkmann et al. |
| 2016/0161055 | A1 | 6/2016 | Bain |
| 2016/0271805 | A1 | 9/2016 | Kuolt et al. |
| 2017/0050315 | A1 | 2/2017 | Henry et al. |
| 2017/0057091 | A1 | 3/2017 | Wagner et al. |
| 2017/0080571 | A1 | 3/2017 | Wagner et al. |
| 2017/0087718 | A1 | 3/2017 | Wagner et al. |
| 2017/0087731 | A1 | 3/2017 | Wagner et al. |
| 2017/0120455 | A1 | 5/2017 | Wagner et al. |
| 2017/0121113 | A1 | 5/2017 | Wagner et al. |
| 2017/0136632 | A1 | 5/2017 | Wagner et al. |
| 2017/0225330 | A1 | 8/2017 | Wagner et al. |

FOREIGN PATENT DOCUMENTS

| | | |
|---|---|---|
| CN | 203680306 U | 7/2014 |
| CN | 104181723 A | 12/2014 |
| DE | 3810989 A1 | 8/1989 |
| DE | 10121344 A1 | 7/2002 |
| DE | 102007054867 A1 | 5/2009 |
| DE | 102011115951 A1 | 4/2013 |
| EP | 1348873 B1 | 12/2004 |
| EP | 1671906 A1 | 6/2006 |
| EP | 1256421 B1 | 1/2008 |
| EP | 2014587 A2 | 1/2009 |
| EP | 2708335 A1 | 3/2014 |
| EP | 2960024 A2 | 12/2015 |
| JP | H6155399 A | 3/1986 |
| JP | H0769470 A | 3/1995 |
| JP | 2010201536 A | 9/2010 |
| WO | 2014161549 A1 | 9/2014 |
| WO | 2017044632 A1 | 3/2017 |

OTHER PUBLICATIONS

Communication pursuant to Article 94(3) EPC issued by the European Patent Office in related European Patent Application No. 16763400.5 dated Jul. 12, 2021, 4 pages.
Communication pursuant to Rules 161(1) and 162 EPC issued by the European Patent Office dated Apr. 5, 2018 in related European Patent Application No. 16763400.5, 3 pages.
Engineering ToolBox, (2008). Vacuum Pipes—Veocities, [online] Available at https://www.engineeringtoolbox.com/vacuum-pipes-air-velocity-d 1195.html.
Examiner's Report issued by the Innovation, Science and Economic Development Canada dated Feb. 28, 2019, in related Canadian Patent Application No. 2,996,868, 3 pages.
Examiner's Report issued by the Innovation, Science and Economic Development Canada dated Dec. 10, 2019, in related Canadian Patent Application No. 2,996,868, 3 pages.
Final Office Action issued by the U.S. Patent and Trademark Office in related U.S. Appl. No. 16/830,574 dated Mar. 25, 2021, 9 pages.
First Office Action, and its English translation, issued by the China National Intellectual Property Administration in related Chinese Patent Application No. 201680061046.1 dated Jul. 30, 2020, 26 pages.
International Preliminary Report on Patentability issued by the International Bureau of WIPO dated Feb. 27, 2018, in related international application No. PCT/US2016/048968, 9 pages.
International Search Report and Written Opinion issued by the International Searching Authority dated Nov. 11, 2016 in related International Application No. PCT/US2016/048968.
Non-Final Office Action issued by the U.S. Patent and Trademark Office dated Jan. 18, 2018 in related U.S. Appl. No. 15/248,379, 6 pages.

(56) References Cited

OTHER PUBLICATIONS

Non-Final Office Action issued by the U.S. Patent and Trademark Office dated Sep. 20, 2019 in related U.S. Appl. No. 16/391,980, 5 pages.

* cited by examiner

SYSTEMS AND METHODS FOR PROVIDING VACUUM VALVE ASSEMBLIES FOR END EFFECTORS

PRIORITY

The present application is a continuation of U.S. patent application Ser. No. 16/830,574, filed Mar. 26, 2020; which is a continuation of U.S. patent application Ser. No. 16/391,980, filed Apr. 23, 2019, now U.S. Pat. No. 10,647,005, issued May 12, 2020; which is a continuation of U.S. patent application Ser. No. 15/961,275, filed Apr. 24, 2018, now U.S. Pat. No. 10,300,612, issued May 28, 2019; which is a divisional of U.S. patent application Ser. No. 15/248,379, filed Aug. 26, 2019, now U.S. Pat. No. 9,999,977, issued Jun. 19, 2018; which claims priority to U.S. Provisional Patent Application Ser. No. 62/210,246, filed Aug. 26, 2015, the disclosure of which are hereby incorporated by reference in their entireties.

BACKGROUND

The invention generally relates to robotic systems and relates in particular to articulated arms that include end effectors that provide a vacuum source for object acquisition or gripping.

Such vacuum grippers exist in many configurations in the prior art. Generally, such devices use compressed air to generate a vacuum by use of a Venturi pump. The vacuum is then presented at the object to be acquired through any one of a variety of interfaces.

One type of interface is a single large open port, which maximizes the suction pressure from the vacuum and is thus well equipped to acquire heavy objects or those packaged in loose plastic. This configuration is commonly referred to as a bag type gripper.

Another type of interface is an array of smaller ports, each of which may have integrated flow control (due to their small hole size) designed to close or reduce them if they are not making contact with the object to be acquired. By closing unsealed ports, the suction pressure at ports that have successfully mated with the object to be acquired should be maximized. This approach provides flexibility in object acquisition since not all ports need to mate with an object in order to successfully acquire it. This flow control is generally accomplished by means of metering (or making the ports small enough that the resulting leakage from an unsealed port is immaterial).

In other vacuum gripper systems, integrated check valves may be used in port chambers that contact the environment. Typically, such devices include seals around the vacuum ports at the surface that meets the object to be acquired. This approach, while being more mechanically complicated, has the advantage of stronger overall suction force, since unsealed ports truly close at the opening, rather than just restricting leakage flow. For single large ports, a large suction cup or foam ring is used. For the array of ports configuration, an array of suction cups or a foam pad with holes for each of the individual ports are commonly used.

In some vacuum gripper systems, a set of actuated valves is provided for the air flowing through the gripper; a valve on the compressed air input allows for shutting the vacuum on and off, allowing the gripper to drop an object. This approach, however, is slow due to time constants of air pressure equalization within the gripper body. The speed of release is dramatically increased by adding a second controlled valve to the exhaust port of the vacuum generator; by closing this valve, compressed air is diverted through the gripper body and out the vacuum ports, effectively blowing the acquired object off of the gripper surface quickly.

The vacuum grippers in the prior art are generally designed for a specific object or material in a predetermined orientation. The specific gripper style and configuration is chosen to optimize for a particular acquisition problem (for instance, palletizing and de-palletizing a particular size/type of cardboard cartons). Such grippers are not at all well suited to a wide array of objects in non-predetermined orientations.

Further, in such vacuum gripper systems, software systems and algorithms are provided that are developed around the concept of maximizing speed and efficiency of abort/retry cycles for robotic manipulators acquiring objects. These algorithms have been focused in some applications on heavily instrumented multiple-finger mechanical grasping manipulators. The algorithms use the data from joint angles and motor power to determine how well an object is grasped and immediately retry if the grasp is not good enough.

In many such vacuum gripper systems, abort/retry techniques with vacuum grippers are unsophisticated. These techniques generally consist of applying vacuum, lifting the gripper, and looking at coarse flow rate or weight sensors to determine whether an object has been acquired; if it has not, the gripper is placed back on the object and acquisition is re-attempted. This is due largely to two reasons: 1) most currently deployed vacuum gripping systems are customized so heavily for the material being acquired that acquisition failures are rare, resulting in no real need for rapid abort and retry cycles, and 2) no vacuum grippers exist with the type of sophisticated instrumentation present in, for instance, a multi-fingered grasping type end effector. The result is that existing abort/retry algorithms cannot obtain from a vacuum gripper the information they need to be able to operate.

There remains a need, therefore, for an improved vacuum gripper for use in an articulated arm that provides improved performance in acquiring a wide variety of known and unknown objects.

SUMMARY

In accordance with an embodiment, the invention provides an end effector for an articulated arm. The end effector includes a valve assembly including a plurality of supply channels, each supply channel including a supply conduit, a pressure sensor in fluid communication with the supply conduit, and a supply conduit plug. The supply conduit is in fluid communication with a vacuum source. During use, each supply conduit is either at vacuum such that the pressure within the supply conduit is substantially at a vacuum pressure, or is at a pressure that is substantially higher than vacuum pressure because the supply conduit plug has moved to block a portion of the supply conduit. The pressure sensor of each supply conduit provides a pressure sensor signal responsive to whether the pressure in the conduit is either substantially at vacuum or is at a pressure that is substantially higher than vacuum.

In accordance with another embodiment, the end effector includes a valve assembly including a plurality of supply channels, each supply channel including a supply conduit, a pressure sensor in fluid communication with the supply conduit, and a supply conduit plug. The supply conduit is in fluid communication with a vacuum source. During use, each supply conduit is either at vacuum such that the pressure within the supply conduit is substantially at a vacuum pressure, or is at a pressure that is substantially higher than vacuum pressure because the supply conduit plug has moved to block a portion of the supply conduit. The pad includes a plurality of defined apertures, each of which is aligned with a respective supply conduit of the valve assembly, and the plurality of defined apertures in the pad include at least a first aperture and a second plurality of apertures, and wherein the at least the first aperture is centrally located with respect to the second plurality of apertures In accordance with a further embodiment, the invention provides a method of providing a vacuum source to an end effector. The method includes the steps of providing within the end effector a valve assembly including a plurality of supply channels, each supply channel including a supply conduit, a pressure sensor in fluid communication with the supply conduit, and a supply conduit plug, providing a vacuum source in fluid communication with the supply conduit, permitting the supply conduit to be at a pressure that is substantially higher than vacuum pressure when the associated supply channel is not engaged with an object, permitting the supply conduit to be at vacuum such that the pressure within the supply conduit is substantially at a vacuum pressure when the supply channel is engaged with an object, and providing a pressure sensor signal responsive to whether the pressure in the conduit is either substantially at vacuum or is at a pressure that is substantially higher than vacuum.

BRIEF DESCRIPTION OF THE DRAWING

The following description may be further understood with reference to the accompanying drawings in which.

The drawings are shown for illustrative purposes only.

DETAILED DESCRIPTION

In accordance with various embodiments, the invention provides a new instrumented hybrid-modality vacuum gripper system that has three main features as follows. First, the system provides hybrid modality. The gripping surface is a unique design that incorporates the advantages of both the single large port configuration and the array of controlled ports configuration of vacuum gripper, resulting in a single device that is more effective than either previously existing configuration. Second, the system provides unique instrumentation. The gripper is mounted to the end effector using a load cell array, such that controlling software has precise knowledge of weights and torques being applied to the gripper by the acquired object. Each individual vacuum port in the gripping surface is also instrumented such that controlling software has precise knowledge of how well each individual port is gripping the object that is being acquired. Third, the novel software and algorithms provide that presented sensor data may be used to maximize the efficiency of abort/retry cycles using this instrumented gripper. The general approach of hybrid modality, instrumentation, and algorithms applied to vacuum grippers is illustrated, in part, by the following examples.

Figure 1:
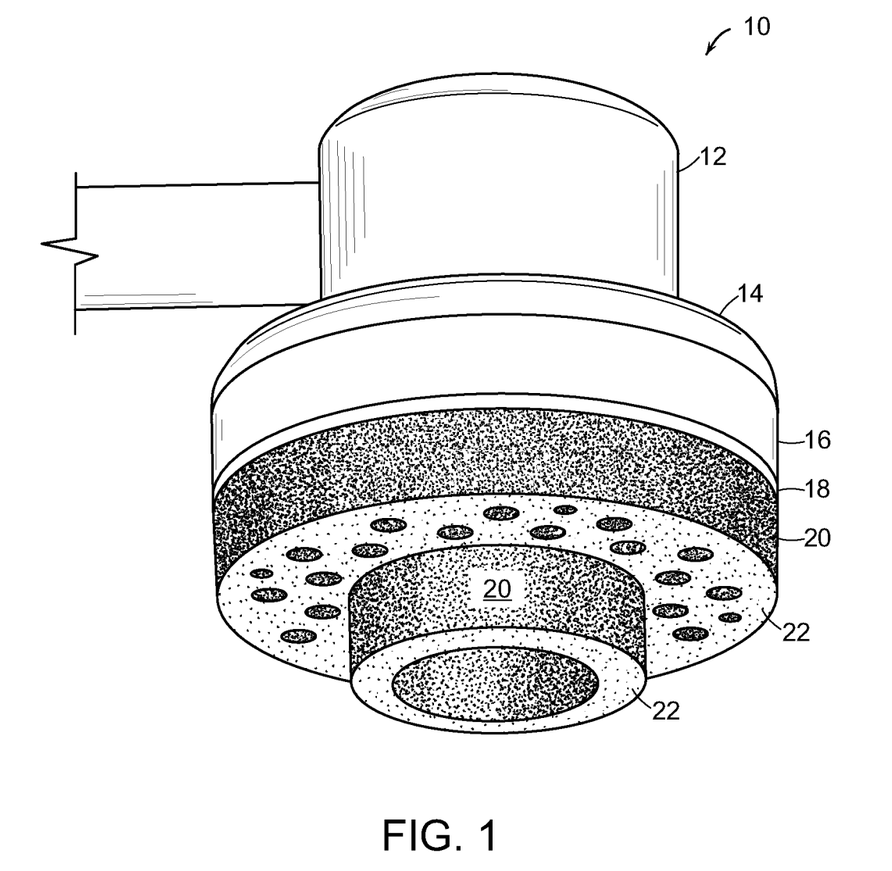
FIG. 1 shows an illustrative diagrammatic view of an end effector in accordance with an embodiment of the present invention.

The instrumented gripper assembly in accordance with an embodiment is shown in FIG. 1. The gripper assembly 10 includes a vacuum generation head 12, a plenum block 14, a check valve plate 16, a screen plate 18 and sealing foam 20 having gripping surfaces 22. The sealing foam includes two sets of apertures, one set that is generally centrally located with respect to the other set as further shown in FIGS. 6 and 7.

The vacuum generation and control is provided by moving compressed air through a control valve to a Venturi pump, which creates a vacuum for the gripper to distribute to the gripping surface. A second valve on the output of the Venturi pump allows one to blow-off acquired objects, as described above.

The plenum block is provided below the Venturi pump, and the plenum block distributes the generated vacuum to each of the individual ports in series by means of a channels that are machined into the block. This approach minimizes the vacuum pressure required to check any individual port's control valve.

Figure 2:
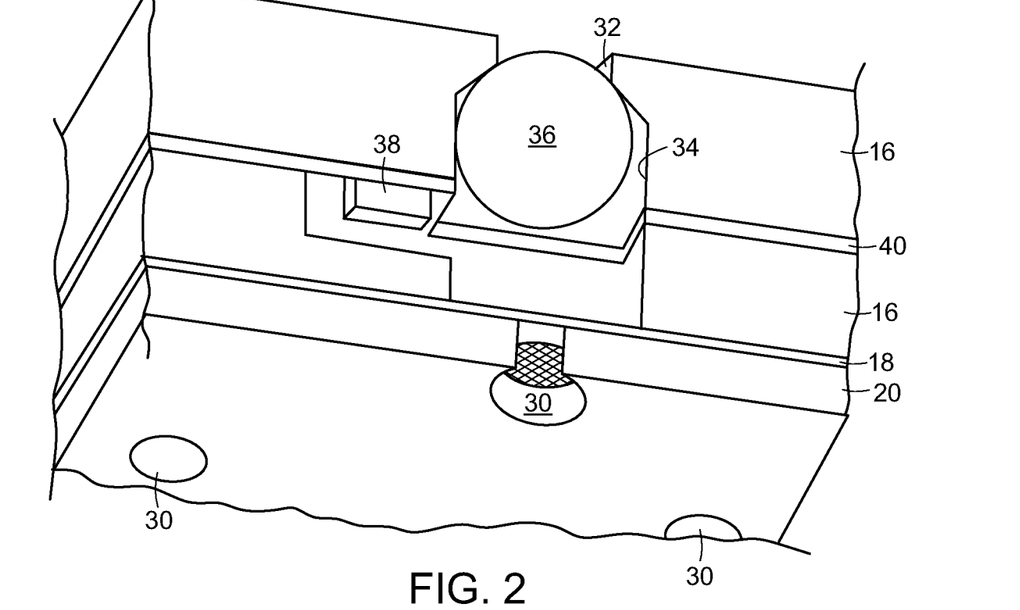
FIG. 2 shows an illustrative diagrammatic view of a portion of the check valve plate of the end effector of FIG. 1 with a ball plug urged against the top plate and providing a single opening in connection with the check valve.
Figure 3:
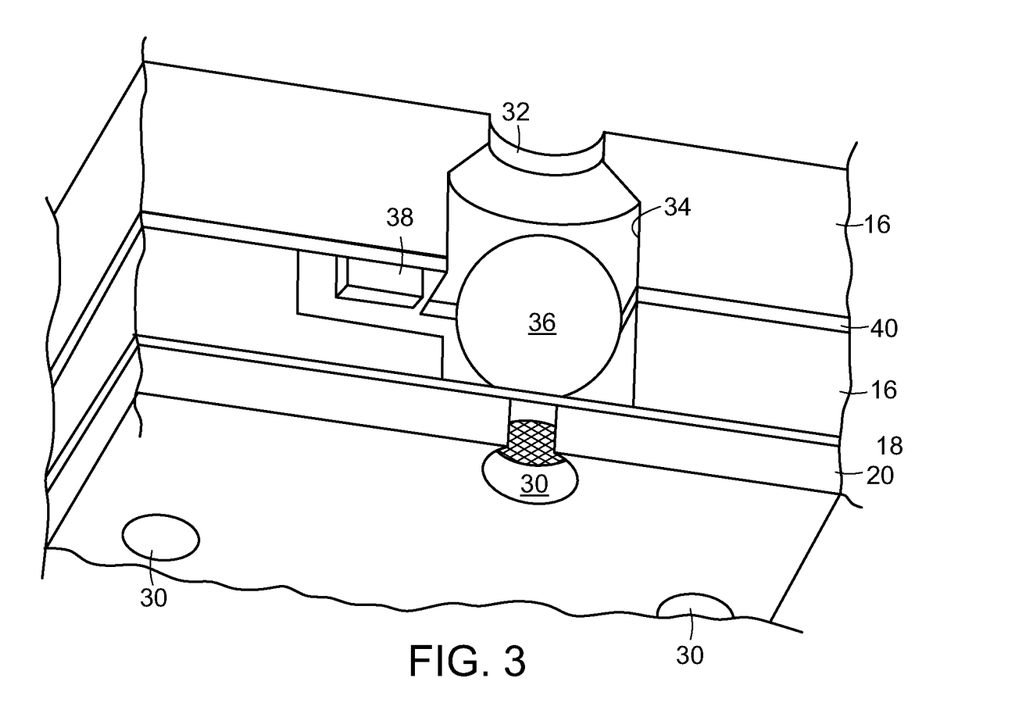
FIG. 3 shows an illustrative diagrammatic view of the portion of the check valve plate shown in FIG. 2 with the ball plug disengaged from the top plate.

With further reference to FIG. 2, the check valve plate consists of a number of chambers, each having a straight opening 30 at the bottom and a chamfered opening 32 at the top. A single such chamber (supply conduit) 34 is shown in detail in FIG. 2, together with a supply conduit plug (ball) 36 and the opening to the vacuum plenum block 32, and a pressure sensor 38. The pressure sensor 38 is responsive to the pressure within the chamber 34 and provides a signal to a printed circuit board 40 in the check valve plate 16. The screen plate 18 includes a plurality of screen openings in communication with chamber 34. Each of the openings 30 and chambers 34 align with and are associated with a unique aperture in the sealing foam gripper 20, and each check valve assembly (including the chamber 34, opening 32, conduit plug 36 and pressure sensor 38) functions independent of the other check valve assemblies.

The top opening 32 mates to the plenum, thus providing a vacuum to the check valve chamber 34. The bottom opening 30 delivers the vacuum through the screen plate 18 to the bottom surface of the gripper 20, and thence to the object being acquired. The plug 36 in each check valve chamber is a plastic ball, of such a size and weight that if the bottom opening is open to atmosphere (i.e., not making contact with an object to be acquired) and a vacuum is applied to the top opening, the plastic ball 36 will be pulled by the vacuum up to the top opening, where it will seat firmly against the chamfer there and effectively seal that particular check valve port. By using these types of ports, it is ensured that any ports that are not actually making contact with an object to be acquired are sealed and not bleeding off vacuum pressure.

The screen plate 18 mounts to the bottom of the check valve plate 16. It consists of a thin metal piece with openings that mate to each check valve. These openings are of such a size and shape (trefoil shape is used here) as to allow the ball 36 to sit on the opening without falling out, and without sealing the lower opening 30. In this way, when the port is not making contact with an object to be acquired, air will flow through this opening, lifting the ball to the top of the chamber and sealing off that particular port. When the port is making contact with an object, the vacuum will be present in the chamber 34 and will hold the object against the surface 22 of the gripper 20.

Of significance in this design is the incorporated printed circuit board 40. The check valve plate is split into two pieces, top and bottom as shown in FIG. 2, and the printed circuit board 40 is sandwiched between these two halves. On the printed circuit board 40 is mounted an array of MEMS barometers, each of which is provided as a pressure sensor 38 for a port (again, a single port is shown in FIG. 2). These sensors (MEMS barometers) are placed such that they are able to detect the air pressure in the bottom of the valve chamber near the gripper surface. Other openings 30 in the gripper 20 are associated with other valve assemblies (including other chambers, openings, conduit plugs and pressure sensors).

When a vacuum is applied to the gripper, ports that are contacting the object being acquired will remain unchecked, meaning that the sensors in those ports will read vacuum pressure (<<1 atmosphere). Any ports that are not contacting the object will check, meaning the pressure in the bottom of the chamber will be equivalent to atmospheric pressure. By reading all of the sensors, the software system will know exactly which ports are checked and which are making solid contact (and thus providing gripping force) to the object being acquired. Even once an object has been acquired, if it starts to "peel off" of the gripper, or falls off completely, the sensor readings will change accordingly, allowing the software system to know this in real time.

Figure 4:
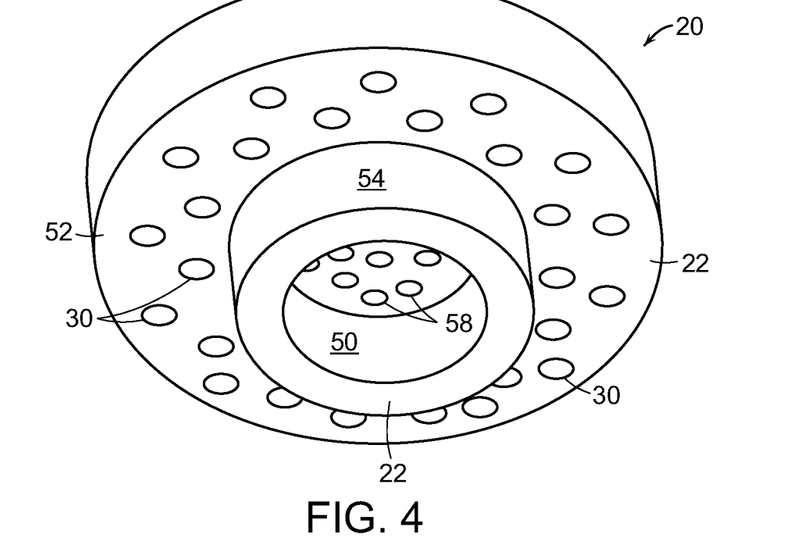
FIG. 4 show an illustrative diagrammatic isometric view of the sealing foam of the end effector of FIG. 1.
Figure 5:
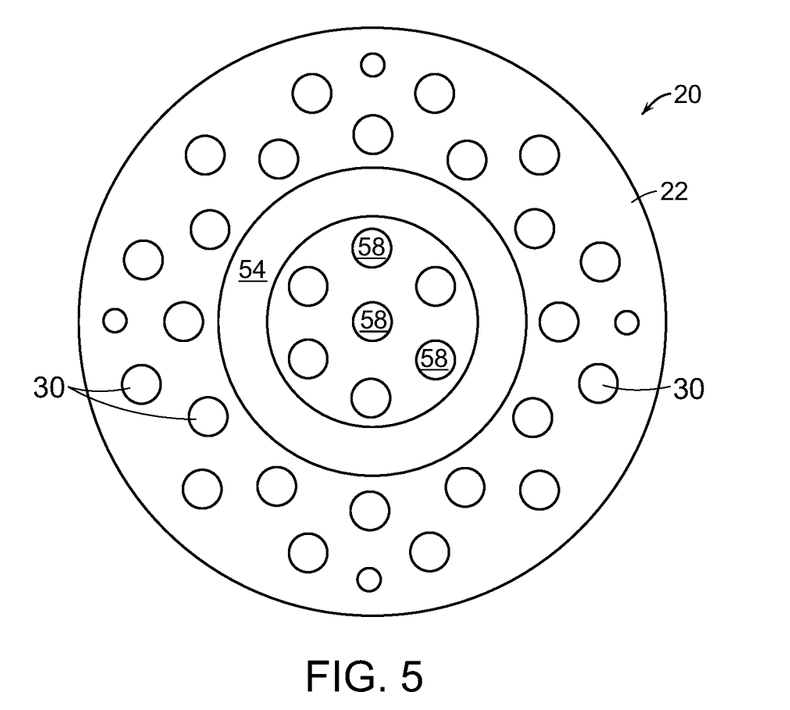
FIG. 5 shows an illustrative diagrammatic bottom view of the sealing foam of FIG. 4.

The gripper is circular at the gripping surface, as shown in FIGS. 4 and 5. This shape and symmetry provide another degree of freedom to the software control system. Again, the gripping surface 22 consists of an array of ports, each of which has an integrated check valve and pressure sensor as described above. Further, the gripping surface is comprised of two sections, a radially inner section 50 and a radially outer section 52. The sections are separated by a foam ring 54, which encloses the central grouping of apertures 58 and extends beyond the rest of the gripping surface. The second piece of foam fits around the outside of the first foam ring and extends to the outer edge of the gripper surface. It contains individual apertures 30 for each vacuum port.

The effect of this arrangement is a hybrid modality gripper combining the benefits of the single-large-port (or "bag") configuration and the array-of-controlled-ports configuration. The ports 58 in the middle (as shown in FIGS. 4 and 5) are all commonly open to each other within the foam ring, so that they can achieve the suction strength of a single large port while still being controlled with check valves. The foam ring is smaller and extends further than the rest of the gripping surface; this essentially acts as a secondary smaller gripper, allowing this device to access and acquire smaller object surfaces where the larger gripper could not otherwise fit. For larger items, simply pushing the entire device down to compress the foam ring will present the entire gripping surface to the object, allowing for compliant lifting of large objects with non-uniform surfaces.

Figure 6:
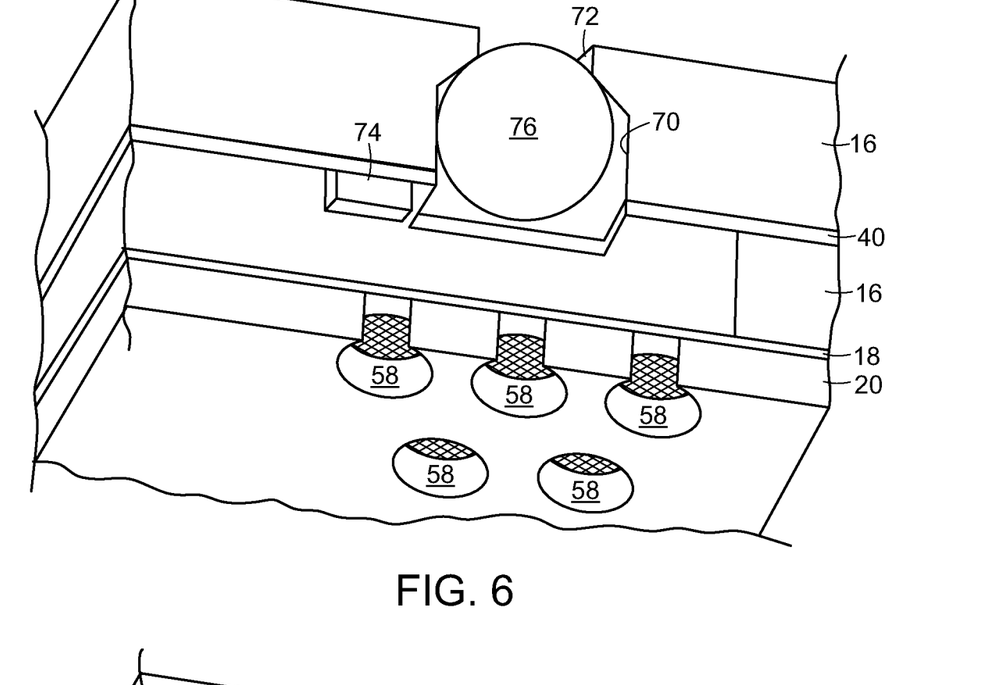
FIG. 6 shows an illustrative diagrammatic view of a portion of the check valve plate of the end effector of FIG. 1 with a ball plug urged against the top plate and providing vacuum to multiple openings in connection with the check valve.
Figure 7:
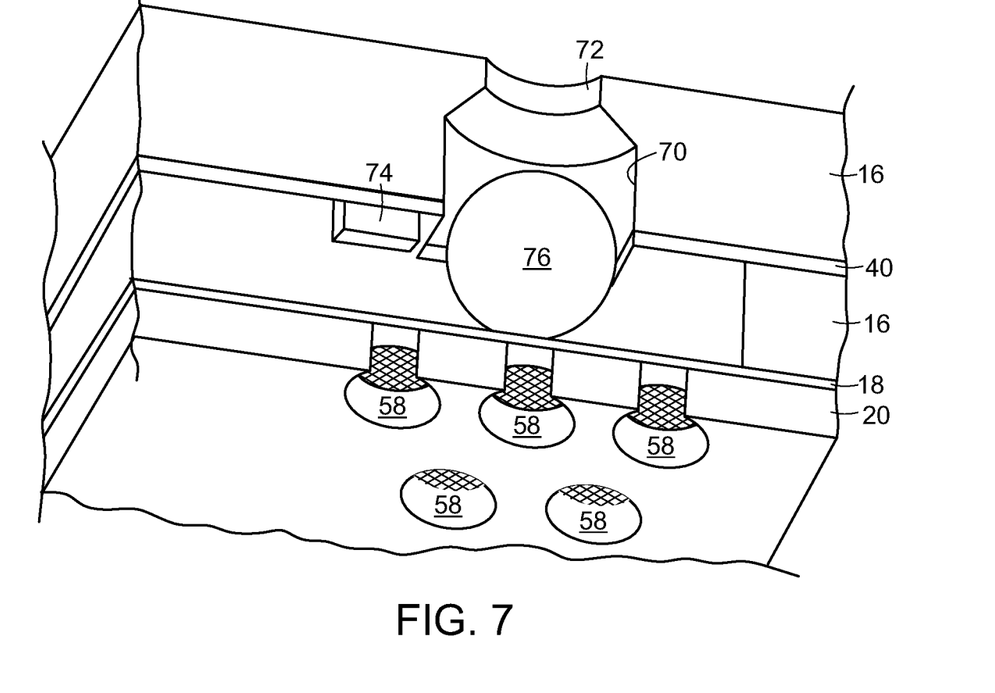
FIG. 7 shows an illustrative diagrammatic view of the portion of the check valve plate shown in FIG. 6 with the ball plug disengaged from the top plate.

FIGS. 6 and 7 show the portion of the check valve plate that provides that multiple ports in the gripper may be commonly in communication with a single vacuum source. In particular, the central portion of the check valve plate includes a chamber 70 having straight openings 58 at the bottom and a chamfered opening 72 at the top. A single such chamber (supply conduit) 70 is shown in detail in FIG. 6, together with a supply conduit plug (ball) 76 and the opening to the vacuum plenum block 72, and a pressure sensor 74. Again, the pressure sensor 74 is responsive to the pressure within the chamber 70 and provides a signal to the printed circuit board 40 in the check valve plate 16. The screen plate 18 includes screen openings aligned with chamber 70. Each of the openings 58 are in communication with the chamber 70.

The top opening 72 mates to the plenum, thus providing a vacuum to the check valve chamber 70. The bottom openings 58 deliver the vacuum through the screen plate 18 to the bottom surface of the gripper 20 in the inner area 50 as a common group of apertures, and thence to the object being acquired. Again, the plug 76 in the check valve chamber is a plastic ball, of such a size and weight that if the bottom opening is open to atmosphere (i.e., not making contact with an object to be acquired) and a vacuum is applied to the top opening, the plastic ball 76 will be pulled by the vacuum up to the top opening, where it will seat firmly against the chamber there and effectively seal that particular check valve port as shown in FIG. 6. By using these types of ports, it is ensured that any ports that are not actually making contact with an object to be acquired are sealed and not bleeding off vacuum pressure. When the port is not making contact with an object to be acquired, air will flow through this opening, lifting the ball to the top of the chamber and sealing off that particular port. When the port is making contact with an object, the ball 76 will drop (as shown in FIG. 7) and the vacuum will be present in the chamber 70 and will hold the object against the surface of the gripper 20 in the inner area 50.

This hybrid modality allows for successful acquisition of a much broader spectrum of objects than either prior type of vacuum gripper by itself. Heavy objects in plastic bags (e.g., a bag of oranges) typically cannot be acquired by standard port-array type vacuum grippers, but only by single large port type grippers; the central port grouping on the novel gripper presented here can acquire these objects. Another example is a bottle of shampoo standing upright; a typical single large port type gripper will be too large to seal to the top of the cap, and thus will not acquire the object. The novel gripper here can use a single port from the outer ring to seal to the shampoo cap; all other ports, including the central group, will check, allowing this device to successfully acquire the object. In other embodiments, different vacuum pressures may be applied to the inner set of apertures as compared to the outer set of apertures in a variety of ways, including for example, restricting air flow in the outer set of apertures.

This combination of power and flexibility is unique and powerful. By combining the benefits of multiple configurations, the result is greatly reduced or eliminated need for tool changing, along with the associated cost and time.

In accordance with certain embodiments, the invention further provides a system for providing high flow vacuum control to an end effector of an articulated arm. In accordance with various embodiments, the invention provides a dynamic high flow gripping system, and may optionally include a mechanism to select between the high flow source and a high vacuum source, depending on the application. High flow vacuum systems of the invention may therefore optionally be used with high vacuum sources.

The system, for example, may include a first vacuum source for providing a first vacuum pressure with a first maximum air flow rate (to for example, the inner area 50), and a second vacuum source for providing a second vacuum pressure with a second maximum air flow rate (to for example, the outer area 52). In certain embodiments, the second vacuum pressure is higher than the first vacuum pressure and wherein the second maximum air flow rate is greater than the first maximum air flow rate. The reverse is also possible in other applications. The flow rates are characterized as maximum air flow rates because, when an object is engaged at an end effector, the flow rate may drop significantly. The high flow source may be used together with a high vacuum source, or as a single source.

Figure 8:
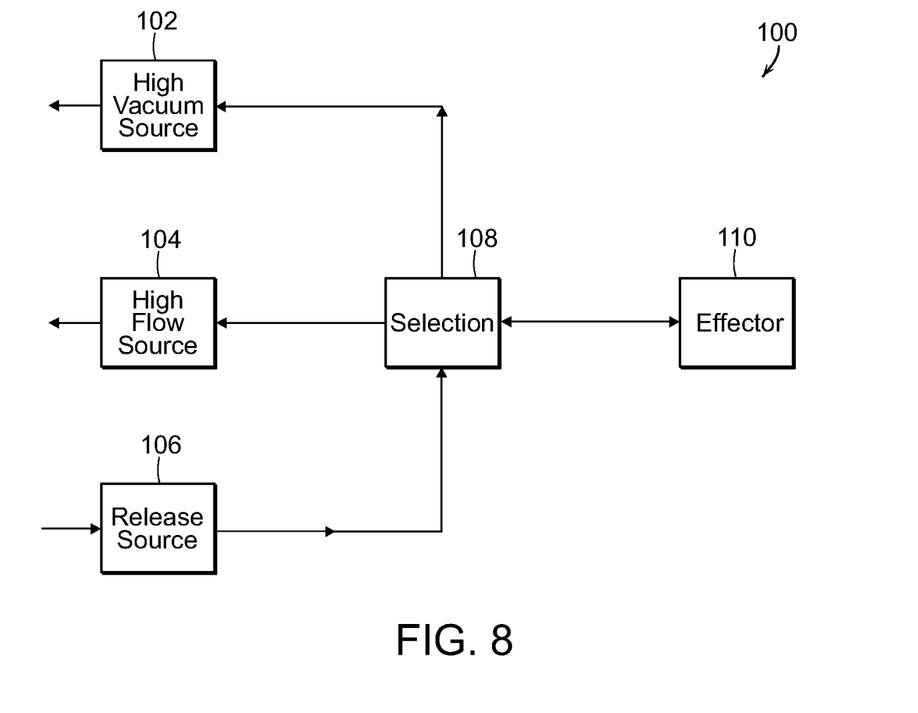
FIG. 8 shows an illustrative diagrammatic block view of vacuum supply system for use with the end effector of FIG. 1.

FIG. 8, for example, shows a system 100 for use with an end effector in accordance with an embodiment of the present invention in which an optional high vacuum source 102 is provided as well as a high flow source 104 and a release source 106 that are each coupled to a selection unit 108, that is coupled to an end effector 110. The selection unit 108 selects between the high vacuum source 102, high flow source 104 and the release source 106 for providing any of high vacuum, vacuum with high flow, or a release flow to the end effector. FIG. 8 therefore shows a general form of the invention, comprising mechanisms for producing high vacuum and high flow, a release source providing either atmospheric pressure via a vent or high pressure (blow off) via a compressor or reservoir, and a mechanism for selecting the source best suited to the present situation.

Figure 9:
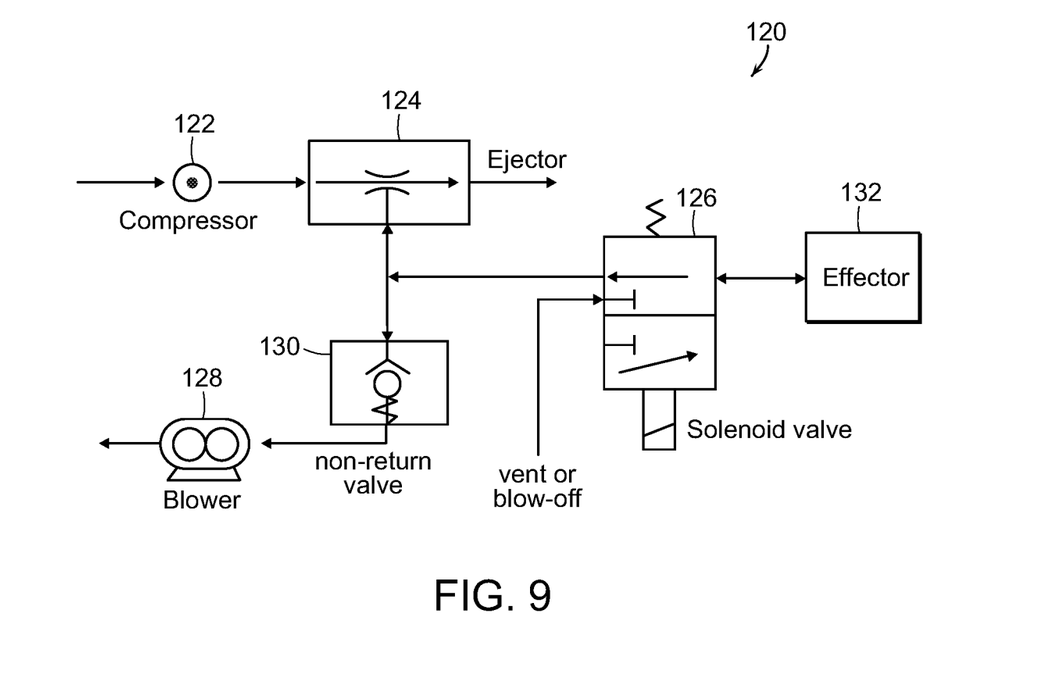
FIG. 9 shows an illustrative diagrammatic view of an example of the vacuum supply system of FIG. 8.

In particular, FIG. 9 shows a system 120 in accordance with an embodiment of the invention that includes a compressor 122 that is coupled to an ejector 124 to provide a high vacuum source that is coupled to a solenoid valve 126. A blower 128 is also coupled to the solenoid valve 120 via a non-return valve 130, and the blower 128 provides a vacuum source with a high maximum flow rate. A vent or blow-off source is also provided to the solenoid valve 120, the output of which is provided to an end effector 132. The system therefore, provides the ejector 124 as the high vacuum source, the regenerative blower 128 as the high flow source, the non-return valve 130 as a passive selection mechanism, and the solenoid valve 120 connecting the effector to the release source, either vent or blow-off.

The vacuum pressure provided by the ejector 124 may be, for example, at least about 90,000 Pascals below atmospheric and the vacuum pressure provided by the blower 128 may be only no more than about 25,000 Pascals below atmospheric in some examples, and no more than about 50,000 Pascals below atmospheric in other examples. The vacuum pressure provided by the blower 128 is therefore higher than the vacuum pressure provided by the ejector 124. The maximum air flow rate of the ejector may be, for example, no more than about 5 cubic feet per minute (e.g., 1-2 cubic feet per minute), and the maximum air flow rate of the blower may be, for example at least about 100 cubic feet per minute (e.g., 130-140 cubic feet per minute).

Figure 10A:
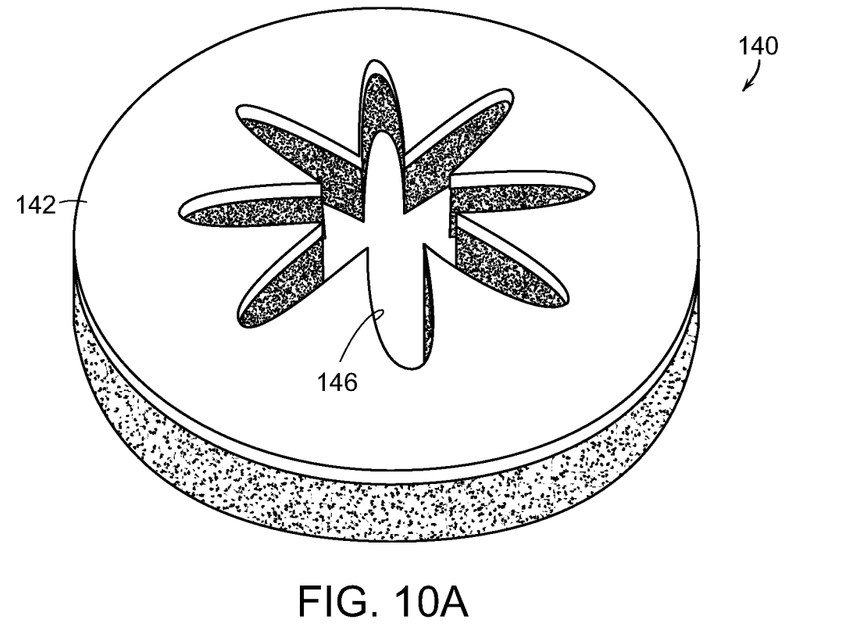
FIGS. 10A and 10B show illustrative diagrammatic views of an end effector cover for use with an end effector on an embodiment of the invention.
Figure 10B:
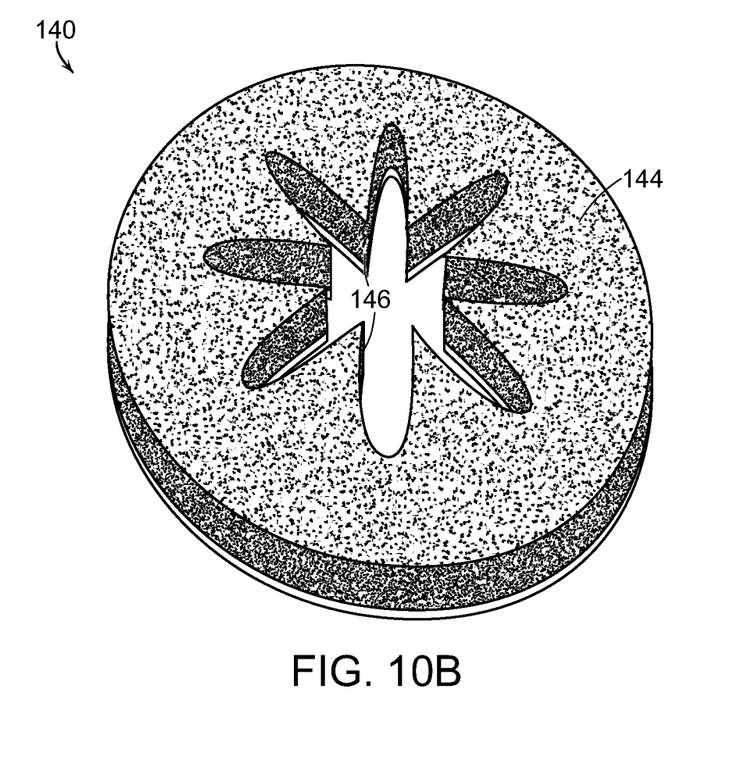

In accordance with certain embodiments, therefore, end effectors of the invention may include a central region of a gripper surface that provides high flow gripping. In further embodiments, the surface at the central region of the gripper may include a specialized opening cover for use with a high flow vacuum gripper. In particular and as shown in FIGS. 10A (articulated arm facing side) and 10B (object facing side), such a cover 140 may include a proximal back side 142 that does not permit air to flow through the material, and distal front side 144 for engaging objects that is formed of a foam material. Slit openings 146 in form of a star or asterisk shape are provided through the material in this example. During use, elongated objects may be received along opposing slit openings and held by the foam material.

Figure 11:
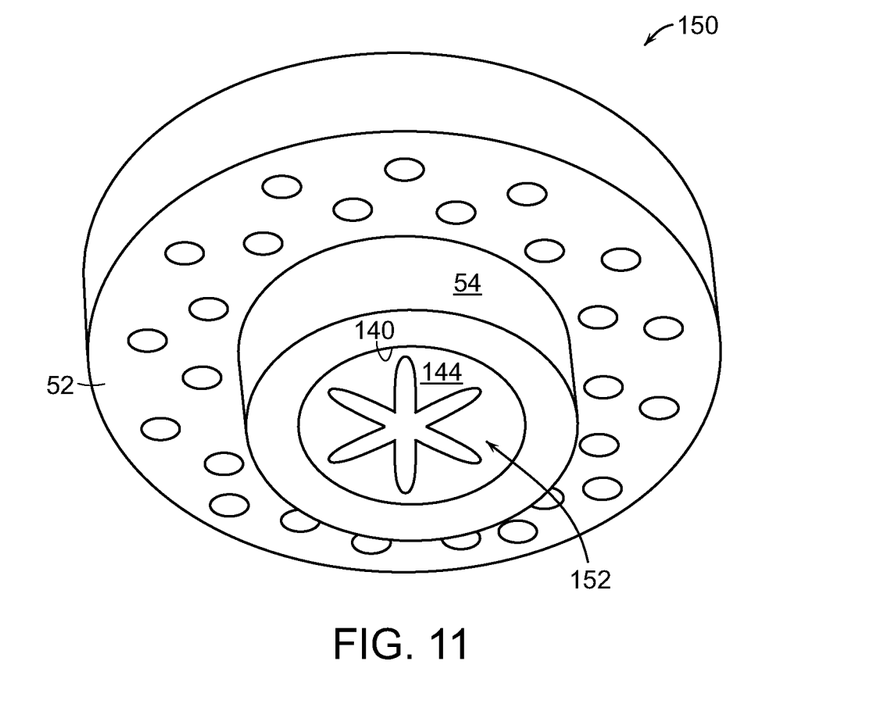
FIG. 11 shows an illustrative diagrammatic isometric view of an end effector in accordance with another embodiment of the invention.

The compliant foam on the surface 144 contacts the object to be acquired, giving the gripper some compliance while also acting to seal the aperture around the object as the foam is compressed and the high flow vacuum is applied. The aperture cover therefore allows a high flow gripper to effectively pick up long narrow objects with an easy to attach cover that may be held in a tool changer and added or removed from the gripper autonomously during real-time operation FIG. 11 shows an end effector gripper 150 having such a cover 140 used in connection with a gripper surface having an outer section 52 as discussed above, and an inner section 152 providing high flow through the cover 140. The cover may also be flush with the circular wall 54 as shown.

A system is therefore provided in an embodiment, for providing vacuum control to an end effector of an articulated arm, where the system includes a vacuum source for providing a vacuum pressure at a flow rate to the end effector, and the end effector includes a cover that includes an opening that varies significantly in radius from a center of the cover. The opening may include finger openings that extend radially from the center of the opening. The opening may be generally star shaped or asterisk shaped. The cover may include compliant foam on a distal side of the cover that engages an object to be grasped, and an air flow resistant material on a proximal side of the cover. The vacuum pressure may be no more than about 50,000 Pascals below atmospheric, and the air flow rate may be at least about 100 cubic feet per minute.

The invention therefore provides a system for providing vacuum control to an end effector of an articulated arm, where the system includes a vacuum source for providing a vacuum pressure at a flow rate to the end effector, and the end effector includes a cover including an air flow resistant material on a proximal side of the cover and a compliant material on a distal side of the cover for contacting objects to be grasped. The cover may include an opening that varies significantly in radius from a center of the cover, and the opening may include finger openings that extend radially from the center of the opening. The opening may be generally star shaped or asterisk shaped. The cover may be formed of a compliant material and include compliant foam on a distal side of the cover that engages an object to be grasped, and the cover may include an air flow resistant material on a proximal side of the cover. The vacuum pressure may be no more than about 25,000 Pascals or 50,000 Pascals below atmospheric, and the air flow rate may be at least about 100 cubic feet per minute.

Figure 12A:
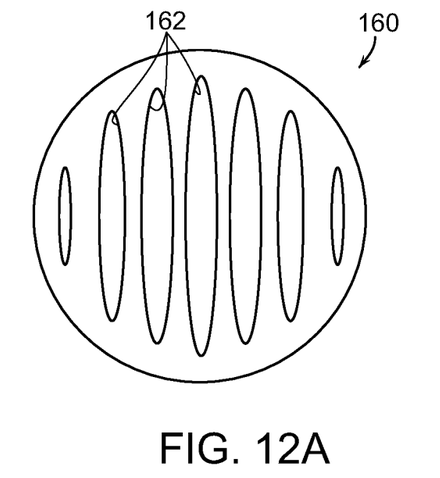
FIGS. 12A-12D show illustrative diagrammatic views of end effector covers for use in accordance with further embodiments of the invention.
Figure 12B:
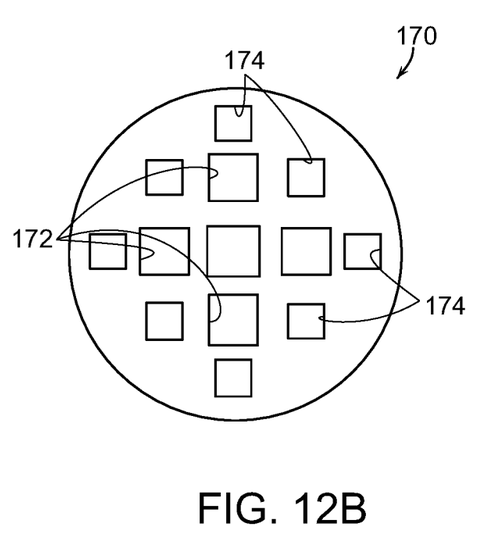
Figure 12C:
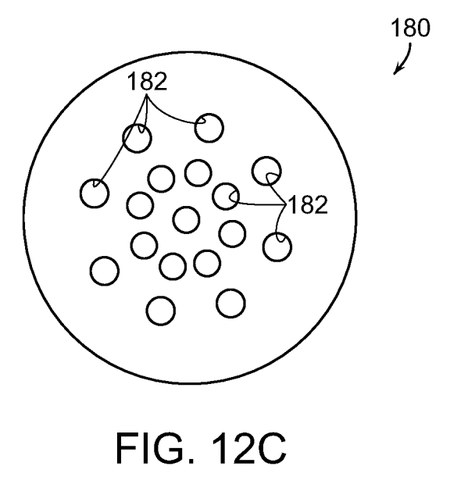
Figure 12D:
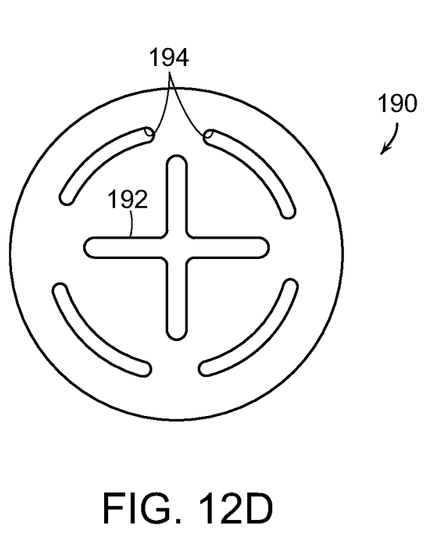

Covers with other types of openings are shown in FIG. 12A-12D. FIG. 12A, for example, shows a cover 160 that includes slit openings 162. FIG. 12B shows a cover 170 that includes different sized square openings 172, 174. Cover 180 shown in FIG. 12C includes small circular openings 182, and cover 190 shown in FIG. 12D includes differently shaped openings 192 and 194. In each of the covers 140, 160, 170, 180 and 190, a compliant foam surface may face the object to be acquired, and more area of the cover is provided to be open closer to the center of the cover with respect to the outer periphery of each cover. For example, in the cover 140, the center of the asterisks shape is most open. In the cover 160, the larger slits are provided in the center. In the cover 170, the larger square openings are provided in the center. In the cover 180, the greater concentration of the circular openings is provided in the center, and in the cover 190, the lager shape 192 is provided in the center.

Figure 13:
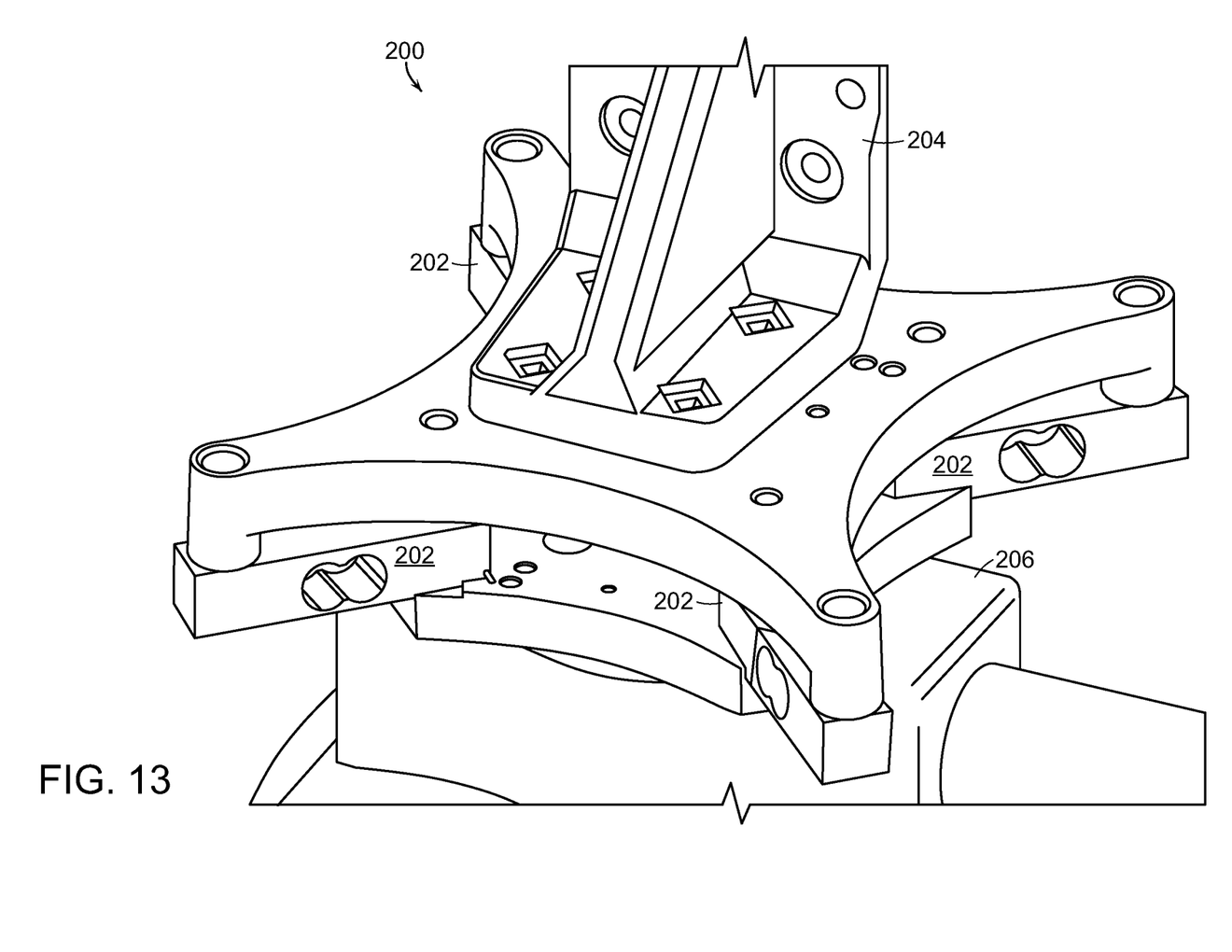
FIG. 13 shows an illustrative diagrammatic view of mounting hardware including load cells for mounting an end effector of the invention to a robotic arm.

The gripper assembly may be mounted to the end of a wide variety of 4- or 6-axis robotic arms. The mounting assembly 200 incorporates load cells, as shown in FIG. 13. There are four load cells 202, placed between the mounting bracket 204 at the end of the robotic arm and the top surface of the gripper body 206. One of these load cells is placed at each corner of the gripper body, allowing the SW system to precisely know the distribution of weight of an acquired object and the resulting forces and torques that the object is placing on the gripper. These sensors will also detect if an object has fallen off of the gripper during acquisition or movement; the Software system will integrate this data with the data provided by the array of pressure sensors in the check valve block to provide input to the algorithms that are maximizing abort/retry efficiency and speed.

The system therefore, does not require the use of sophisticated software algorithms that use probabilistic and predictive processes to maximize speed and efficiency of acquisition/failure/abort/retry cycles with multi-fingered hand-type grasping end effectors. These algorithms rely on precise data about joint angles and motor speeds/currents/torques as well as image data from 2D or 3D camera systems to know whether or not an acquisition has been successful and plan a retry if necessary. Because vacuum grippers have previously lacked any type of similarly sophisticated sensing, and because previous applications have been limited and highly controlled, these algorithms have not been applied previously to vacuum gripping situations.

The novel gripper described here provides such data using inexpensive sensors (load cells and MEMS barometers). When the gripper is placed on an object and the vacuum is enabled, the software control system will immediately have a map of which ports are providing suction to the object and which are checked closed. With a priori knowledge of the object (from 2D/3D imaging and database matching, for instance), the SW will be able to calculate a success percentage for object acquisition.

If the percentage is below a threshold, the control system can shut off vacuum and reposition the gripper to try again quickly without having to actually attempt and fail at acquisition first. This will greatly enhance retry speed.

If the percentage is above some threshold, the control system can raise the gripper. At this point, the data from the load cell array will begin to tell the control system whether or not the object weight is being lifted, and at what position and torque. As the object is being moved, the load cell and port pressure data will also warn the control system if the acquisition is failing and the object is going to fall, allowing the control system to take appropriate action.

This data will provide the software control system a real time picture of where, how, and how well an object is acquired, from before the gripper has even been moved all the way through object delivery and release. This data can be used by a software control system as input for efficient abort/retry algorithms previously only used by more sophisticated manipulators.

The instrumented hybrid-modality vacuum gripper presented here therefore, combines the benefits of prior vacuum gripper configurations into a single device, at the same time integrating sensors that provide the kind of detailed acquisition data needed to enable advanced abort/retry efficiency software algorithms previously reserved for more sophisticated multi-finger type grippers. The result is a single inexpensive end effector that can be used to rapidly and efficiently acquire and move a very broad spectrum of object types, sizes, weights, and packaging types, in a variety of orientations.

Those skilled in the art will appreciate that numerous modifications and variations may be made to the above disclosed embodiments with departing from the spirit and scope of the present invention

What is claimed is:

1. A method of manipulating an object with an end-effector comprising:
    providing a pad of the end-effector, the pad including a plurality of pad apertures therein that are not mutually connected within the pad, each pad aperture being in communication with a supply channel of the end-effector, each supply channel including a top aperture, a bottom aperture and a plug therebetween, each bottom aperture being adjacent at least one pad aperture of the plurality of pad apertures;
    applying the pad of the end-effector to the object such that a first subset of the plurality of pad apertures are in contact with the object while a second subset of the plurality of pad apertures are not in contact with the object;
    applying a vacuum pressure to the top apertures of each of the supply channels;
    applying the vacuum pressure through the first subset of the plurality of pad apertures to grasp the object by vacuum force; and
    blocking each of the supply channels in communication with the second subset of the plurality of pad apertures with the associated plug by virtue of the vacuum force at the top aperture of the respective supply channel in communication with each of the second subset of the plurality of pad apertures drawing the plug within the respective supply channel to the top aperture of the respective supply channel.

2. The method as claimed in claim 1, wherein the plug of each supply channel is a spherical ball of size and weight that it is pulled to the respective top aperture when the top aperture is at vacuum pressure and the bottom aperture is at atmospheric pressure.

3. The method as claimed in claim 2, wherein the plug of each respective supply channel does not fit within the bottom aperture when the top aperture is not at vacuum pressure.

4. The method as claimed in claim 2, wherein each respective supply channel includes a screen adjacent the bottom aperture.

5. The method as claimed in claim 1, wherein each supply channel further includes a pressure sensor for providing a signal representative of a pressure in the respective supply channel.

6. The method as claimed in claim 5, wherein each pressure sensor includes a MEMS barometer.

7. The method as claimed in claim 1, wherein the pad is formed of a complaint material.

8. The method as claimed in claim 1, wherein applying a vacuum pressure to the top apertures includes applying vacuum via a vacuum head that is coupled to an articulated arm via a mounting plate.

9. The method as claimed in claim 8, wherein the method further includes providing a load cell signal from a load cell responsive to force distributions by which the mounting plate is coupled to the vacuum head.

10. The method as claimed in claim 8, wherein the method further includes providing a plurality of load cell signals from a plurality of load cells responsive to force distributions by which the mounting plate is coupled to the vacuum head.

11. The method as claimed in claim 1, wherein the method further includes identifying, via electronic processing, which of the supply channels are not being used in grasping the object by vacuum force.

12. The method as claimed in claim 1, wherein the method further includes identifying, via electronic processing, which of the supply channels are being used in grasping the object by vacuum force.

13. The method as claimed in claim 12, wherein the method further includes identifying whether the number of supply channels that are grasping the object by vacuum force is changing.

14. The method as claimed in claim 13, wherein the method further includes identifying whether an object is peeling off of the pad.

15. The method as claimed in claim 13, wherein the method further includes identifying whether an object has been dropped from the pad.

16. The method as claimed in claim 12, wherein the method further includes determining a success percentage in connection with the grasp on the object based on a priori knowledge data regarding the object and the supply channels that are being used in grasping the object by vacuum force.

17. The method as claimed in claim 16, wherein the method further includes shutting off the vacuum pressure responsive to the success percentage.

18. The method as claimed in claim 16, wherein the method further includes raising the end-effector responsive to the success percentage.

19. The method as claimed in claim 18, wherein the method further includes receiving load cell data, and controlling movement in real time of the end-effector responsive to the load cell data.

20. A method of manipulating an object with an end-effector comprising:
applying a pad of the end-effector to the object, the pad including a plurality of pad apertures, and the pad being applied to the object such that a first subset of the plurality of pad apertures are in contact with the object while a second subset of the plurality of pad apertures are not in contact with the object;
applying a vacuum pressure to each of a plurality of supply channels that are in communication with the pad apertures, each supply channel including a top aperture, a bottom aperture and a plug therebetween, the vacuum pressure being applied to the top aperture, and each bottom aperture being adjacent at least one pad aperture of the plurality of pad apertures;
applying the vacuum pressure through the first subset of the plurality of pad apertures to grasp the object by vacuum force; and
blocking each of the supply channels in communication with the second subset of the plurality of pad apertures with the associated plug by virtue of the vacuum force at the top aperture of the respective supply channel in communication with each of the second subset of the plurality of pad apertures drawing the plug within the respective supply channel to the top aperture of the respective supply channel.

21. The method as claimed in claim 20, wherein the plug of each supply channel is a spherical ball of size and weight that it is pulled to the respective top aperture when the top aperture is at vacuum pressure and the bottom aperture is at atmospheric pressure.

22. The method as claimed in claim 21, wherein the plug of each respective supply channel does not fit within the bottom aperture when the top aperture is not at vacuum pressure.

23. The method as claimed in claim 21, wherein each respective supply channel includes a screen adjacent the bottom aperture.

24. The method as claimed in claim 20, wherein each supply channel further includes a pressure sensor for providing a signal representative of a pressure in the respective supply channel.

25. The method as claimed in claim 24, wherein each pressure sensor includes a MEMS barometer.

26. The method as claimed in claim 20, wherein the method further includes identifying, via electronic processing, which of the supply channels are being used in grasping the object by vacuum force.

27. The method as claimed in claim 26, wherein the method further includes identifying whether an object is peeling off of the pad.

28. The method as claimed in claim 26, wherein the method further includes identifying whether an object has been dropped from the pad.

29. The method as claimed in claim 26, wherein the method further includes determining a success percentage in connection with the grasp on the object based on a priori knowledge data regarding the object and the supply channels that are being used in grasping the object by vacuum force.

30. The method as claimed in claim 29, wherein the method further includes shutting off the vacuum pressure responsive to the success percentage.

31. The method as claimed in claim 29, wherein the method further includes raising the end-effector responsive to the success percentage.

32. The method as claimed in claim 31, wherein the method further includes receiving load cell data, and controlling movement in real time of the end-effector responsive to the load cell data.

33. A system for manipulating an object with an end-effector comprising:
a pad of the end-effector for application to the object, the pad including a plurality of pad apertures, and the pad including a first subset of the plurality of pad apertures for contact with the object, and a second subset of the plurality of pad apertures for not contacting the object;
a vacuum source for applying a vacuum pressure to each of a plurality of supply channels that are in communication with the pad apertures, each supply channel including a top aperture, a bottom aperture and a plug therebetween, the vacuum pressure being applied to the top aperture, and each bottom aperture being adjacent at least one pad aperture of the plurality of pad apertures, the vacuum pressure applied through the first subset of the plurality of pad apertures to grasp the object by vacuum force; and a plug between the top aperture and the bottom aperture of each of the supply channels, wherein one or more plugs of the supply channels in communication with the second subset of the plurality of pad apertures blocks the respective supply channel by virtue of the vacuum force at the top aperture of the respective supply channel in communication with each of the second subset of the plurality of pad apertures.

34. The system as claimed in claim 33, wherein the plug of each supply channel is a spherical ball of size and weight that it is pulled to the respective top aperture when the top aperture is at vacuum pressure and the bottom aperture is at atmospheric pressure.

35. The system as claimed in claim 33, wherein each supply channel further includes a pressure sensor for providing a signal representative of a pressure in the respective supply channel.

36. The system as claimed in claim 35, wherein each pressure sensor includes a MEMS barometer.

37. The system as claimed in claim 36, wherein the system further includes a load cell for providing a load cell signal responsive to force distributions within the end-effector.

38. The system as claimed in claim 36, wherein the system further includes a plurality of load cell for providing a plurality of load cell signals responsive to force distributions by which the mounting plate is coupled to the vacuum head.

* * * * *

UNITED STATES PATENT AND TRADEMARK OFFICE
CERTIFICATE OF CORRECTION

PATENT NO. : 11,660,763 B2
APPLICATION NO. : 17/504977
DATED : May 30, 2023
INVENTOR(S) : Wagner et al.

Page 1 of 1

It is certified that error appears in the above-identified patent and that said Letters Patent is hereby corrected as shown below:

In the Specification

In Column 1, Line 15 should read:
"filed Aug. 26, 2016, now U.S. Pat. No. 9,999,977, issued"

Signed and Sealed this
Twenty-second Day of August, 2023

Katherine Kelly Vidal
*Director of the United States Patent and Trademark Office*